United States Patent
Eiband

(10) Patent No.: US 7,921,971 B2
(45) Date of Patent: Apr. 12, 2011

(54) LOCKABLE MANUAL RELEASE DEVICE FOR A BRAKE

(75) Inventor: Karl Eiband, Marktoberdorf (DE)

(73) Assignee: Chr Mayr GmbH & Co. KG, Mauerstetten (DE)

( * ) Notice: Subject to any disclaimer, the term of this patent is extended or adjusted under 35 U.S.C. 154(b) by 896 days.

(21) Appl. No.: 11/895,975

(22) Filed: Aug. 28, 2007

(65) Prior Publication Data

US 2008/0058163 A1    Mar. 6, 2008

(30) Foreign Application Priority Data

Aug. 29, 2006 (DE) .................... 10 2006 040 438

(51) Int. Cl.
*F16D 55/08* (2006.01)

(52) U.S. Cl. ..................... 188/72.7; 188/163

(58) Field of Classification Search .............. 188/156, 188/72.2, 72.7, 72.9, 161–163, 71.5, 72.6
See application file for complete search history.

(56) References Cited

U.S. PATENT DOCUMENTS

| | | | | |
|---|---|---|---|---|
| 2,938,607 A | * | 5/1960 | Kershner et al. | 188/72.8 |
| 3,313,381 A | * | 4/1967 | Harting et al. | 188/161 |
| 4,352,415 A | * | 10/1982 | Powell | 188/156 |

* cited by examiner

*Primary Examiner* — Melanie Torres Williams
(74) *Attorney, Agent, or Firm* — W. Norman Roth

(57) ABSTRACT

An electromagnetically released spring-loaded brake for cooperation with a motor or similar, with the manual release of the brake being effected in a tangential direction by means of a manual release lever 9, and with actuation of the manual release lever 9 causing armature disc 3 to be urged towards coil carrier 1 via three or more transmission levers 10 mounting rolls 16 and camming surfaces 14 on armature disc 3. As a result, the width of the air gap between armature disc 3 and coil carrier 1 is reduced so that rotor 6 with its hub 4 will be free to rotate between friction linings 7 on armature disc 3 and flange plate 8. The object was to create a lockable manual release feature the actuation of which requires a low manual force on manual release lever 9, is very flat and compact in structure, has a relatively small diameter and is actuated in a tangentional direction (FIG. 1).

6 Claims, 4 Drawing Sheets

Schnitt C-C
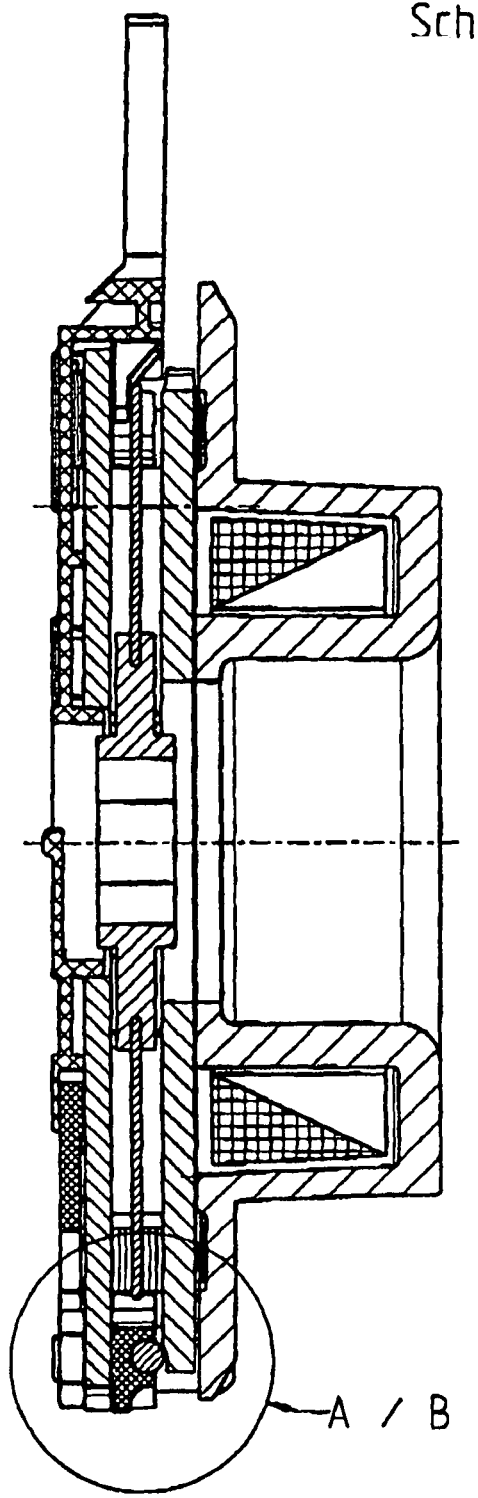
Fig 2
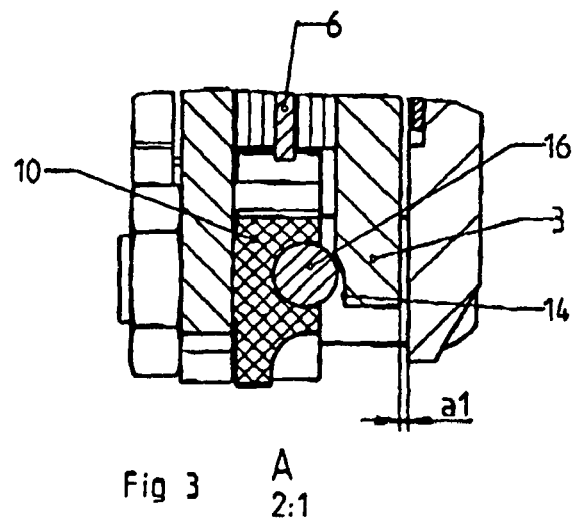
Fig 3  A  2:1
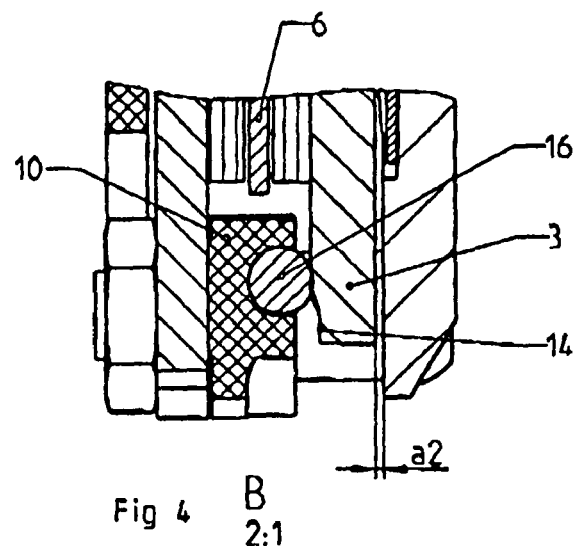
Fig 4  B  2:1

LOCKABLE MANUAL RELEASE DEVICE FOR A BRAKE

PRIOR ART

EP 0 997 660 B1 (to Chr. Mayr) teaches to manually release or disengage an electromagnetic spring-loaded brake in case of power failure. Thus, the braking action can be cancelled by manual operation. Manual operation of the brake involves the principle of circumferentially actuating a ball detent mechanism comprising balls and mating recesses to generate an axial displacement which moves the armature disc against the coil carrier, thus releasing the brake against spring bias.

Through the ball detent mechanism, the manual force to be circumferentially applied can be kept low by virtue of the balls rolling in and through the recesses. Using force transmission means, a low manual force is sufficient to generate a high axial force for moving the armature disc to the coil carrier against said spring bias and to so release the brake.

UNDERLYING OBJECT

In conventional manual brake release schemes for spring-loaded brakes the brake returns to the original engaged condition once the manual force disappears. However, there are cases in which the brake is desired to remain in its non-braked or disengaged condition without some manual force having to be applied permanently to the manual release lever. Thus the object of this invention is to provide a lockable manual brake release feature.

Additional objects are the provision of a sensing function using a limit switch to indicate the disengaged brake position, as well as a lower actuating force, with a lower actuating force of approximately one third the usual level being desirable. This way, the diameter of the manual actuating lever can be held small and the lever itself be accommodated by the structural space assigned to receive it. Further, it was desired to actuate the manual release lever in a tangential direction on the brake periphery, not in an axial direction.

THE INVENTION

In order to reduce the actuating force to approximately one third of the conventional, three transmission levers were connected to the manual release lever to move the armature disc and its three camming surfaces by means of rolls mounted in the transmission levers against the spring bias to so disengage the rotor, which is connected to a hub. The camming surfaces on the armature disc are shaped to hold the rolls on straight-line lands in their end position in the released condition so that the manual release lever will not by itself return to its engaged condition. This results in a lockable manual release feature requiring a lower actuating force. In order to determine its position, the actuating lever was provided with a switching edge capable of actuating any limit switch and to so detect the "brake engaged" and "brake disengaged" positions. The inventive novel manual release feature requires no additional structural space in the axial or radial direction and is accommodated by existing installation space. Further, the inventive solution implements a tangential direction of actuation.

EMBODIMENT EXAMPLE

The drawings show embodiment examples of the invention.

FIG. 1—Section B-B of FIG. 5

There is shown a section through the electromagnetic brake, said section laid through the transmission lever so as to show its function.

FIG. 2—Section C-C of FIG. 5

This section shows the full length of the manual brake release lever.

FIG. 3 shows a detail A of FIG. 2, with the brake in its engaged condition with a nominal air gap a1 approx. 0.2 mm wide.

FIG. 4 shows a detail B in the released condition, in which the armature disc is urged towards the coil carrier to release the brake, reducing nominal air gap a1 to a width a2 of approx. 0.05 mm. Thereby the rotor (which is connected to the hub) is free to rotate.

DESCRIPTION

Figure 1:
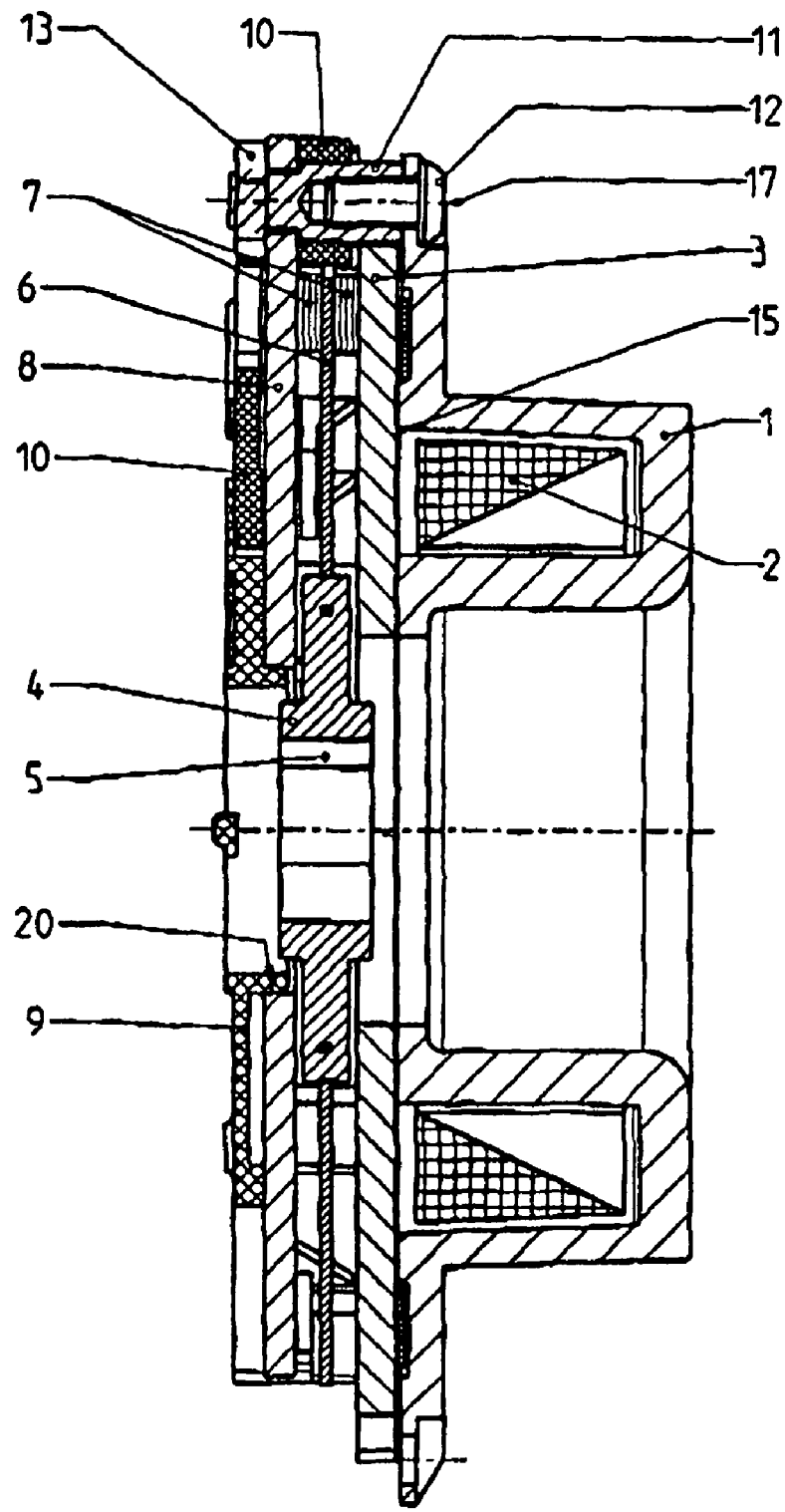

FIG. 1 shows the electromagnetic spring-loaded brake and its coil carrier 1 integrating magnetic coil 2. A corrugated spring washer 15 urges armature disc 3 by its friction lining 7 against rotor 6 and against the second friction lining 7, which is connected with flange plate 8. As a result, the braking torque is transmitted to the central shaft (not shown in the drawings) via rotor 6, which is connected with hub 4 having a hexagonal through-bore 5 therein, said shaft having a hexagonal cross-section. When the magnetic coil 2 energized, armature disc 3 is attracted against corrugated spring washer 15 and rotor 6 and hub 4 with its hexagonal portion 5 are is free to rotate. If the magnetic coil is deenergized, the spring bias of corrugated spring washer 15 causes friction liner 7 of armature disc 3 to urge rotor 6 against friction liner 7 of flange plate 8 to cause rotor 6 to experience a friction generating the braking torque. The braking torque is transmitted from rotor 6 to hub 4 and the hexagonal through-bore 5 therein and to the shaft (not shown).

In order to disengage the brake in case of power failure, the brake can be released by a manual release mechanism.

Figure 6:
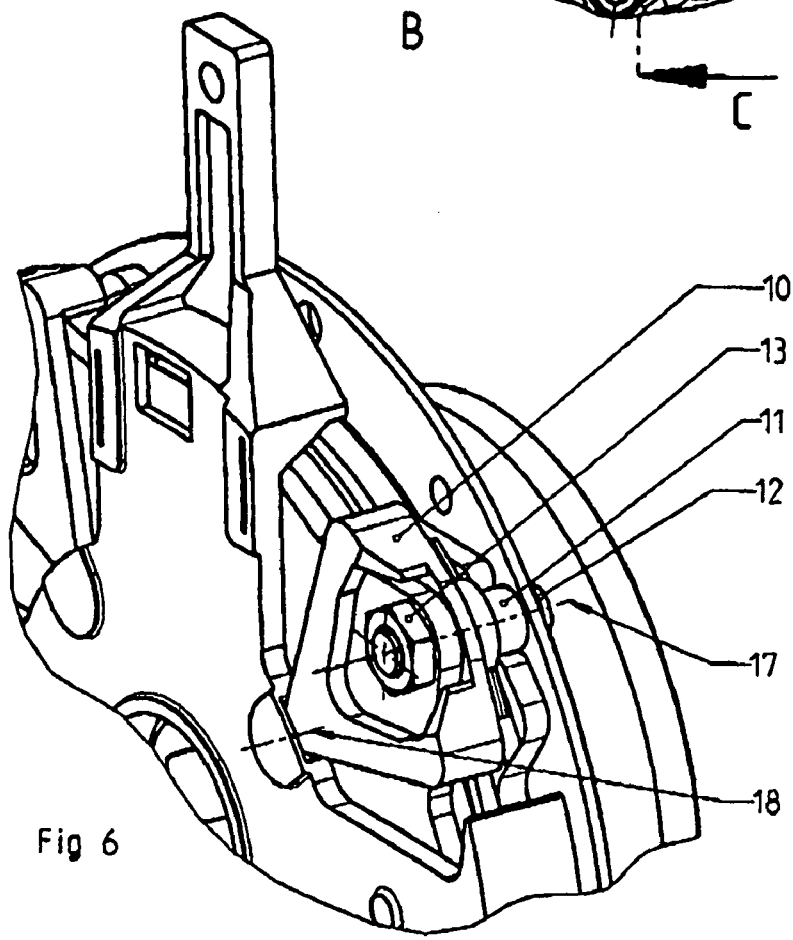
FIG. 6 is an oblique view showing the details of the construction of the transmission lever.
Figure 7:
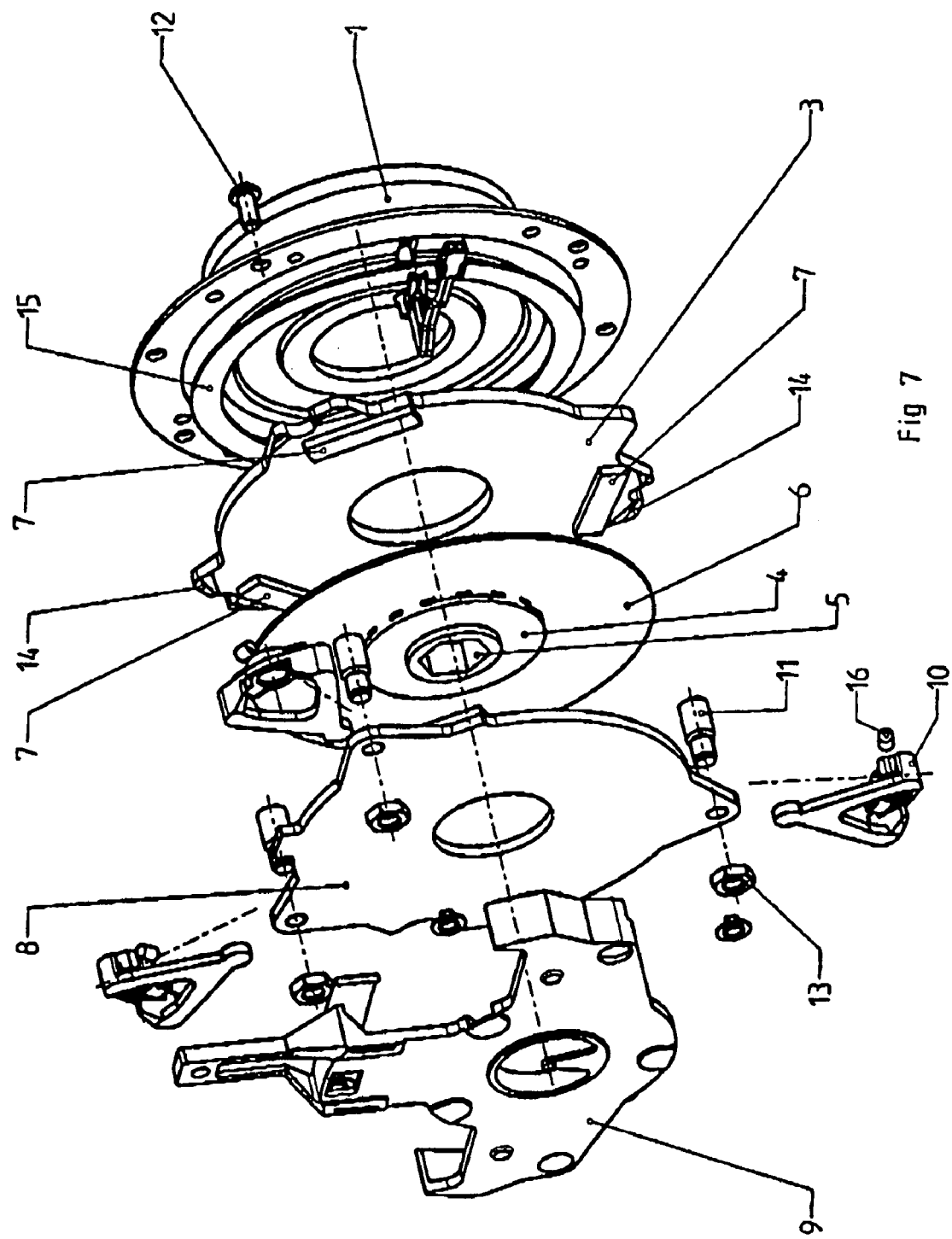
FIG. 7 is an exploded view showing the electromagnetic spring-loaded brake with a lockable manual release feature.

Details A and B of FIGS. 3 and 4, respectively, show the respective conditions, with section A showing the engaged condition and section B showing the released condition. Since shaft 17 (see FIG. 6) does not change its position, actuation of manual release lever 9 moves shaft 18 to the left or to the right, whereby transmission levers 10 make rolls 16 mounted therein (see FIG. 7) to move up camming surfaces 14 on armature 3 (shown in FIG. 3). This will position rolls 16 on the straight-line lands of armature disc 3 and reduce air gap a1 (see FIG. 3) to its width a2 (see FIG. 4), whereby rotor 6 with its hub 4 and hexagonal through-bore 5 is free to rotate. As roll 16 engages the straight-line land on armature disc 3, the complete manual release mechanism will stay in that position and will not return by itself to its initial position when the actuating force disappears.

When manual release lever 9 is returned to its initial position, armature disc 3 moves to its own initial position, i.e. to the engaged position of the brake.

Figure 5:
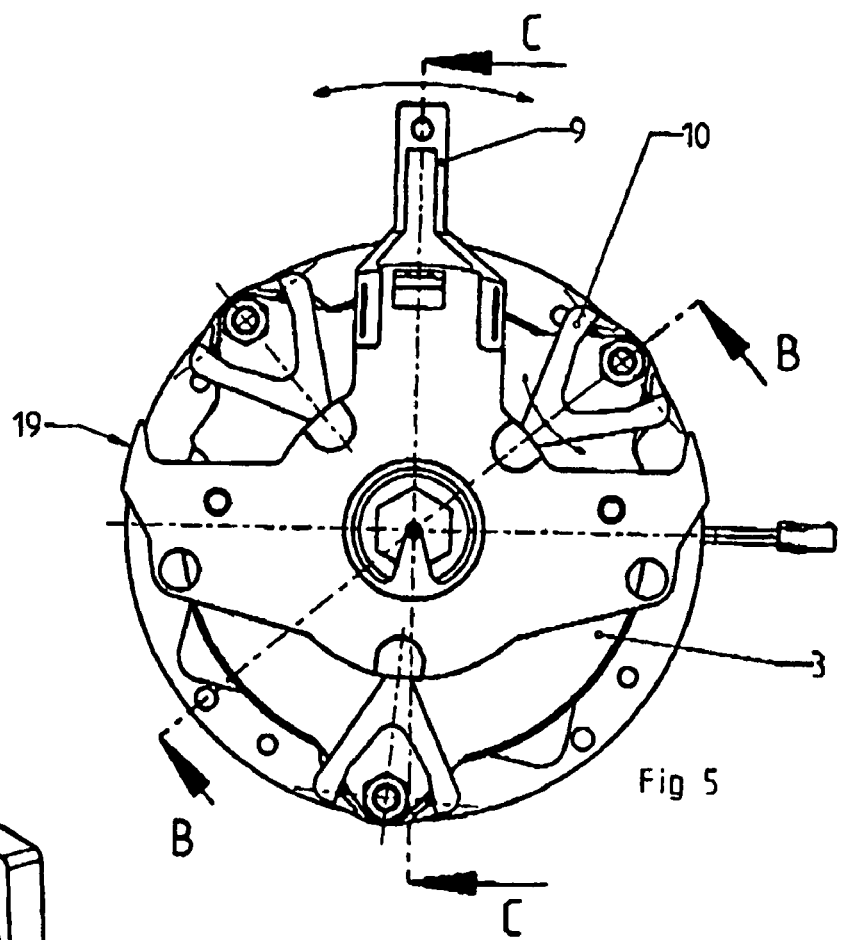
FIG. 5 is a rear view of the brake showing the section planes and the directions of actuating the manual release lever and, analogously, the transmission lever.

The particular shape of the manual release lever results in the tangential movement thereof (shown in FIG. 5) causing the switching edge 19 for a microswitch to change its position and the microswitch to be actuated correspondingly. This enables the position of manual release lever 9 to be monitored, with a signal indicating whether the brake is engaged or disengaged being provided to suitable evaluation electronics.

Manual release lever 9 is centrally guided and mounted for rotation in flange plate 8, which acts as a rotary bearing 20.

LIST OF REFERENCE NUMERALS 1 coil carrier
2 magnetic coil
3 armature disc
4 hub
5 hexagonal through-bore in the hub
6 rotor
7 friction liners
8 flange plate
9 manual release lever
10 transmission lever
11 spacer sleeve
12 fastener
13 locknut
14 camming surface on armature disc
15 corrugated spring washer
16 roll
17 outer shaft/transmission lever 10 stationary
18 inner shaft/transmission lever 10 moveable
19 switching edge for microswitch
20 rotary bearing for manual release lever 9

The invention claimed is:

1. An electromagnetically released spring-loaded brake for braking a rotary shaft, said brake including a tangentially moveable manual release lever and three or more transmission levers pivotally connected to said manual release lever, said transmission levers each having a roll mounted thereon, an armature disc, a flange plate, a coil carrier and a rotor, tangential movement of said manual release lever causing said rolls to engage cam surfaces on said armature disc to reduce an air gap between said armature disc and coil carrier to enable said rotor to freely rotate between friction linings on said armature disc and on said flange plate.

2. Brake as in claim 1, characterized in that the manual release lever has a switching edge (19) for triggering microswitches, said switching edge triggering the contact of a microswitch in response to the actuation of manual release lever (9), causing a corresponding signal to be provided to evaluation electronics.

3. Brake as in claim 1, characterized by transmission lever (10) causing the outer stationary shaft (17) to turn inner moveable shaft (16) in a specific transmission ratio such that the actuating force will be one third only of the conventional force for actuating a manual brake release mechanism.

4. Brake as in claim 1, characterized by camming surface (14) on the armature disc being shaped to retain manual release lever (9) in the disengaged position of the brake following actuation of said lever, so that the manual release feature is a lockable one.

5. Brake as in claim 1, characterized by said brake release feature being designed to be lefthand or righthand, depending on the direction in which manual release lever (9) is actuated.

6. Brake as in claim 1, wherein said rotor includes a hub therein.

* * * * *